US007874230B2

(12) United States Patent
Maquet

(10) Patent No.: US 7,874,230 B2
(45) Date of Patent: Jan. 25, 2011

(54) LOCKABLE ROTARY OPERATING HANDLE SUCH DEVICE

(75) Inventor: Patrick Maquet, Claix (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 929 days.

(21) Appl. No.: 11/605,333

(22) Filed: Nov. 29, 2006

(65) Prior Publication Data

US 2007/0119220 A1 May 31, 2007

(30) Foreign Application Priority Data

Nov. 29, 2005 (FR) .................................. 05 12121

(51) Int. Cl.
*B62D 1/06* (2006.01)
*G05G 1/10* (2006.01)
*F16K 35/00* (2006.01)
*F16K 35/10* (2006.01)

(52) U.S. Cl. ............................ 74/557; 70/177; 70/180; 70/203; 70/212

(58) Field of Classification Search .................. 74/557; 70/14, 19, 58, 177, 180, 203, 212; 200/43.14
See application file for complete search history.

(56) References Cited

U.S. PATENT DOCUMENTS

| | | | | |
|---|---|---|---|---|
| 1,558,628 | A * | 10/1925 | Purcell | 200/43.14 |
| 3,141,933 | A | 7/1964 | Gauthier | |
| 3,171,908 | A | 3/1965 | Malota | |
| 3,690,131 | A * | 9/1972 | Davis et al. | 70/203 |
| 4,424,424 | A | 1/1984 | Hollenback, Jr. | |
| 4,938,040 | A * | 7/1990 | Humphreys, Jr. | 70/58 |
| 5,119,649 | A * | 6/1992 | Spence | 70/14 |
| 5,381,685 | A * | 1/1995 | Carl et al. | 70/58 |
| 5,881,582 | A * | 3/1999 | Monaco | 70/14 |
| 6,829,914 | B2 * | 12/2004 | Bullock | 70/14 |
| 7,207,198 | B2 * | 4/2007 | Benda | 70/19 |
| 7,294,032 | B1 * | 11/2007 | Ventura | 441/75 |
| 7,370,499 | B1 * | 5/2008 | Lee | 70/58 |

FOREIGN PATENT DOCUMENTS

| | | |
|---|---|---|
| CH | 631 819 | 8/1982 |
| DE | 42 06 378 A1 | 9/1993 |
| EP | 0 522 848 A2 | 1/1993 |
| GB | 639687 | 7/1950 |
| JP | 04-145813 | 5/1992 |

* cited by examiner

*Primary Examiner*—Vinh T. Luong
(74) *Attorney, Agent, or Firm*—Steptoe & Johnson LLP

(57) ABSTRACT

A lockable handle assembly, having an operating handle rotatably mounted on a frame, with a bore therein, having an axis extending laterally, a blocking bolt slideably mounted in the handle, one end of the bolt being slideable into a strike in the frame, a drum rotatably mounted in the bore, with a second end of the bolt in contact with the drum so that rotation of the drum moves the bolt into and out of the strike, a lateral hole through the handle and passing through the bore, the drum having a throughhole therein coaxial with the lateral hole in the handle when the drum is positioned with the bolt in the strike, so that a bar extending through both the through-hole in the drum and the lateral hole in the handle prevents rotation of the drum to maintain the bolt is the strike thereby preventing rotation of the handle.

2 Claims, 4 Drawing Sheets

LOCKABLE ROTARY OPERATING HANDLE SUCH DEVICE

BACKGROUND OF THE INVENTION

The invention relates to a rotary operating handle comprising blocking means placed in a body. The blocking means are designed to block the operating handle with respect to a frame and are designed to be locked by interacting at least with one padlock.

STATE OF THE PRIOR ART

The use of rotary operating handles for controlling mechanisms is very widespread. Said handles can be associated in particular with opening and/or closing means of electrical cabinet doors but can also be combined with control means of electrical devices such as switchgear devices in particular.

In the electrical field, safety standards exist the purpose of which is to protect the user against any risk of electrocution. Thus, when a rotary operating handle is associated with opening means of an electrical cabinet or circuit breaker control, the rotary operating handle must comprise locking means in particular enabling any operation of the handle by unauthorized persons to be prevented.

Certain standards recommend the use of padlocks to lock the rotary operating handle.

As described in the document EP0522848, one or more padlocks are used at the same time to block rotation of the handle. Simply placing the padlocks on the handle is sufficient to oppose rotation of the latter.

The Patents EP0522848, GB639687 describe solutions for which fitting a padlock in the handle causes movement of a sliding lock-bolt that interacts with a part of the frame on which the handle is fixed. Moreover, the lock-bolt remains in the active position so long as the padlocks remain in position on the handle.

Simpler solutions, in particular described in the Patent U3321589, consist in blocking rotation of the handle by simultaneously positioning a padlock in a hole of the handle and in a hole located in a frame on which the handle is fixed. Indeed, when the handle is in a given position, for example corresponding to an open position of a circuit breaker, a hole of the handle is then positioned facing a hole placed in the frame. The hasp of the padlock passed through the two holes blocks movement of the handle with respect to the frame.

Other solutions propose handles comprising blocking means which are generally operational in one of the positions of the rotary operating handle. As described in the Patents DE4206378, JP145813, U.S. Pat. No. 3,171,908, the movement of the blocking means prevents any rotation of said handle. The blocking means comprise one or more holes for passage and positioning of the padlocks. The padlocks placed directly on the blocking means lock movement thereof and indirectly prevent movement of the handle. The blocking means are generally retractable and are placed in the body of the rotary handle. They are only apparent and active for certain positions of the handle. In practice, the padlocks prevent movement of the blocking means in the body of the handle. This type of rotary operating handle presents the drawback of having relatively large dimensions, in particular when the blocking means are operational.

SUMMARY OF THE INVENTION

The object of the invention is therefore to remedy the drawbacks of the state of the technique so as to propose a compact rotary operating handle comprising blocking means able to be locked by means of at least one padlock.

The blocking means of the rotary operating handle according to the invention comprise a rotary drum having at least one pass-through hole, said rotary drum being able to be placed in a blocking position preventing any rotation of the operating handle and where, in said blocking position, said at least one hole is aligned with a hole of the body enabling a shackle of a padlock to pass preventing any rotation of the rotary drum from the blocking position to an unblocked position.

Advantageously, the blocking means comprise at least one bolt designed to collaborate with a strike placed in the frame when the rotary drum is in a blocking position.

According to one embodiment, rotation of the rotary drum to the blocking position is caused by the rotation movement of the operating handle.

According to one embodiment, rotation of the rotary drum to the blocking position, independent from the rotation movement of the operating handle, is caused by actuation of gripping means.

Advantageously, flexible means keep the rotary drum in an unblocked position.

Preferably, the rotary drum comprises three radial holes designed to be aligned respectively with three holes of the body when the rotary drum is in its blocking position.

BRIEF DESCRIPTION OF THE DRAWINGS

Other advantages and features will become more clearly apparent from the following description of particular embodiments of the invention, given as non-restrictive examples only, and represented in the accompanying drawings, in which.

DETAILED DESCRIPTION OF AN EMBODIMENT

Figure 1:
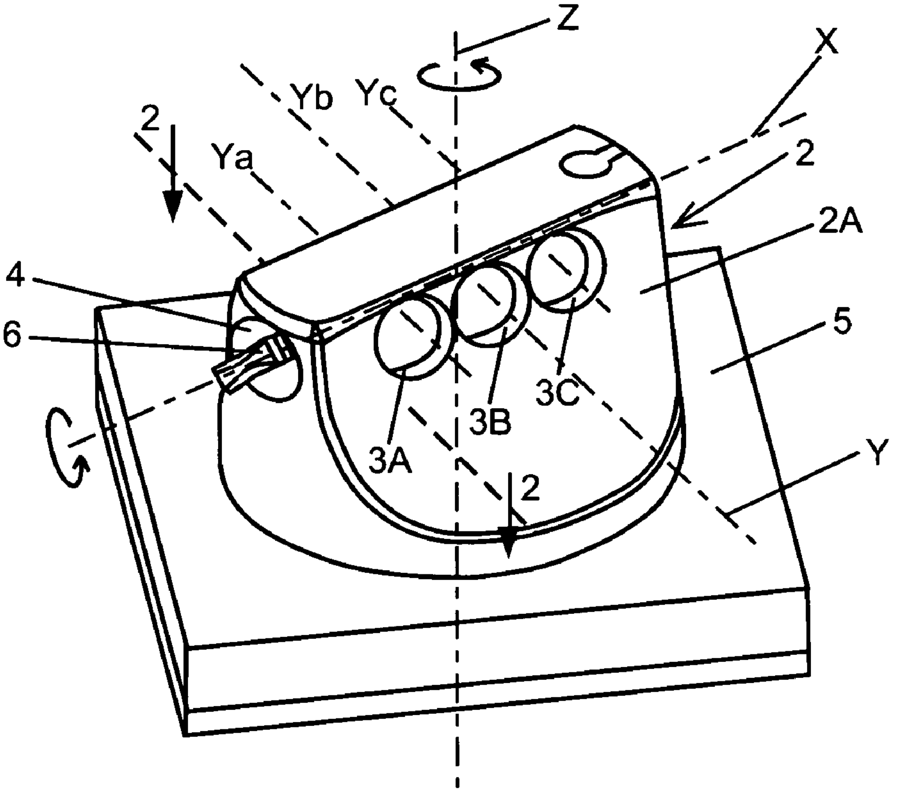
FIG. 1 represents a perspective view of the operating handle in the non-blocked position according to an embodiment of the invention.

According to one embodiment of the invention, as represented in FIG. 1, the rotary operating handle 1 comprises an axis of rotation along the axis Z.

The rotary operating handle 1 is designed to be positioned on a frame 5 and to be connected to actuating means which are not shown. According to this embodiment, these actuating means, commanded by the rotation movement of the rotary operating handle 1, are particularly designed to command opening or closing of the electrical switchgear device.

The rotary operating handle 1 comprises a body 2. Said body preferably comprises at least two external gripping surfaces 2A, 2B. These ergonomic gripping surfaces 2A, 2B enable the user to hold and turn the rotary operating handle notably by means of his thumb and forefinger. According to this embodiment, the gripping surfaces 2A, 2B are substantially parallel and define a control plane XZ.

The body 2 comprises at least 1 hole 3A passing through said body from one side to the other. According to this embodiment, said at least one hole 3A has a longitudinal axis Ya substantially perpendicular to the control planeXZ. In the embodiment described, the body 2 comprises three holes 3A, 3B, 3C respectively having longitudinal axes Ya, Yb, and Yc. Furthermore, the longitudinal axes of said holes, which are paralell to one another, are are spaced from each other along a direction parallel to the axis X.

The body 2 comprises an internal volume in which blocking means are positioned. The blocking means on the one hand comprise at least one rotary drum 4 having a longitudinal axis substantially parallel with the axis X. The rotary drum 4 can swivel freely around its longitudinal axis. This rotation of the drum takes place between a first position called the blocking position and a second position called the unblocked position.

The blocking means also comprise at least one bolt 7 able to collaborate with a strike 8 placed in the frame 5. According to this embodiment, the blocking means comprise a single bolt 7. The bolt preferably has a cylindrical shape.

Figure 3:
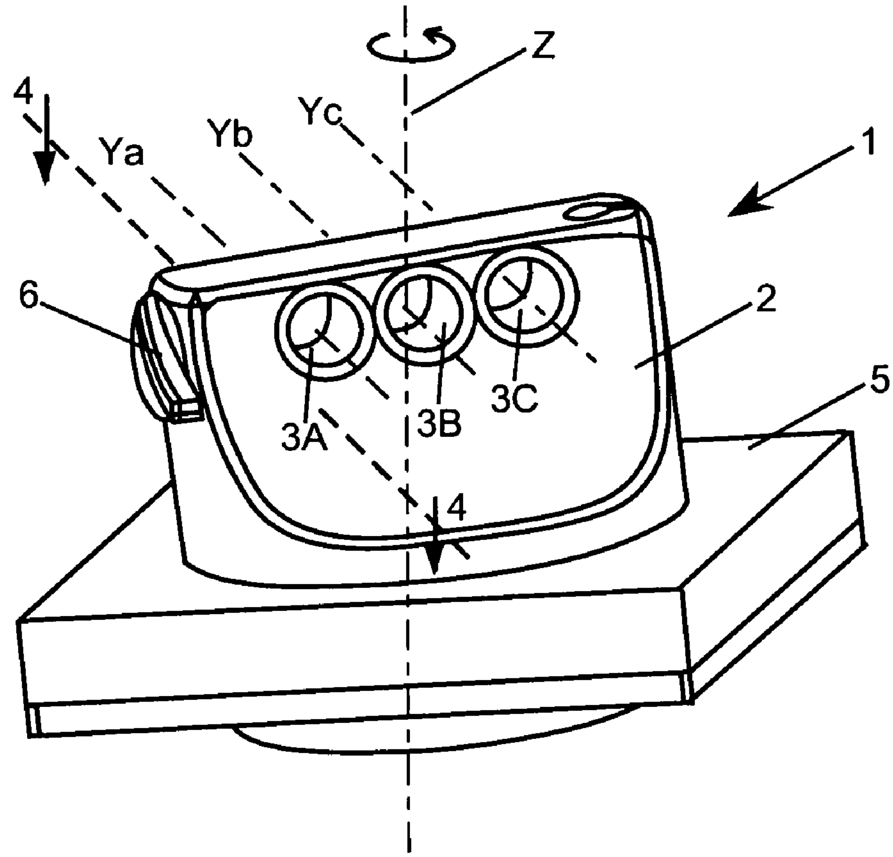
FIG. 3 represents a perspective view of the operating handle in the blocked position.
Figure 4:
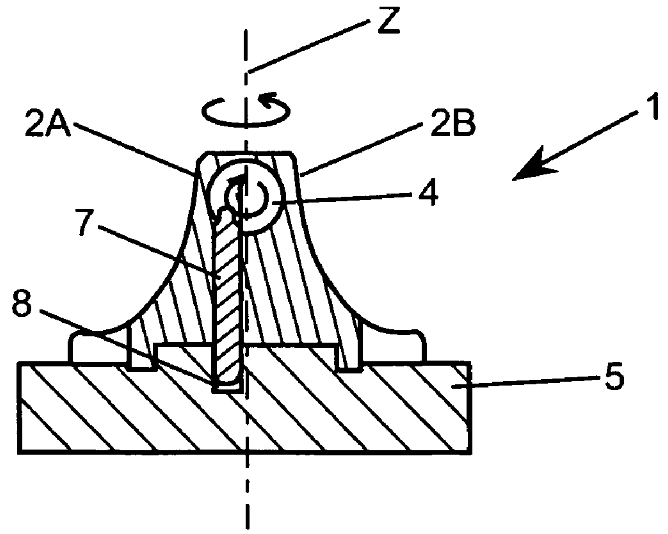
FIG. 4 represents a cross-sectional view of the operating handle taken along line 4-4 in FIG. 3.

As represented in FIGS. 3 and 4, when the rotary drum 4 is in a blocking position, the bolt collaborates with the strike 8 and then prevents any rotation movement of the rotary operating handle 1 about the axis Z with respect to the frame 5.

Figure 2:
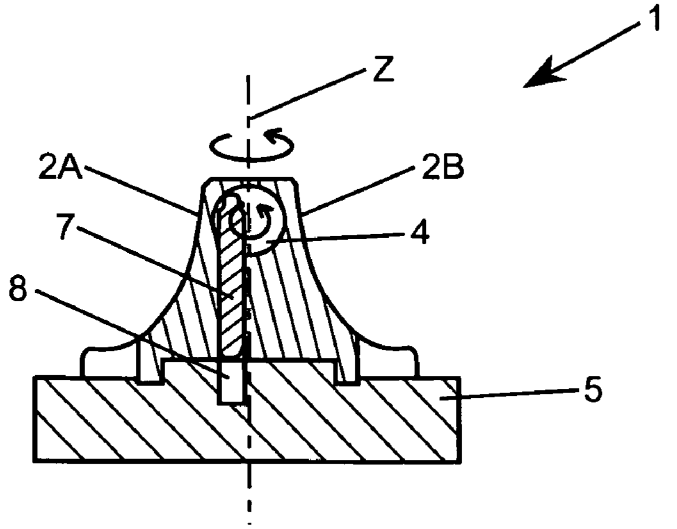
FIG. 2 represents a cross-sectional view of the operating handle taken along line 2-2 in FIG. 1.

As represented in FIGS. 1 and 2, when the bolt 7 is outside the strike 8, the rotary operating handle 1 can then freely perform a rotation around the axis of rotation Z.

Preferably, rotation of the rotary drum 4 to the blocking position thereof automatically causes the bolt 7 to move into the strike 8.

According to this mode of operation, movement of the bolt 7 from the first position to the second position is commanded by rotation of the rotary drum 4. Indeed, rotation of the rotary drum 4 around the axis X makes the bolt move from one position to the other.

Figure 7:
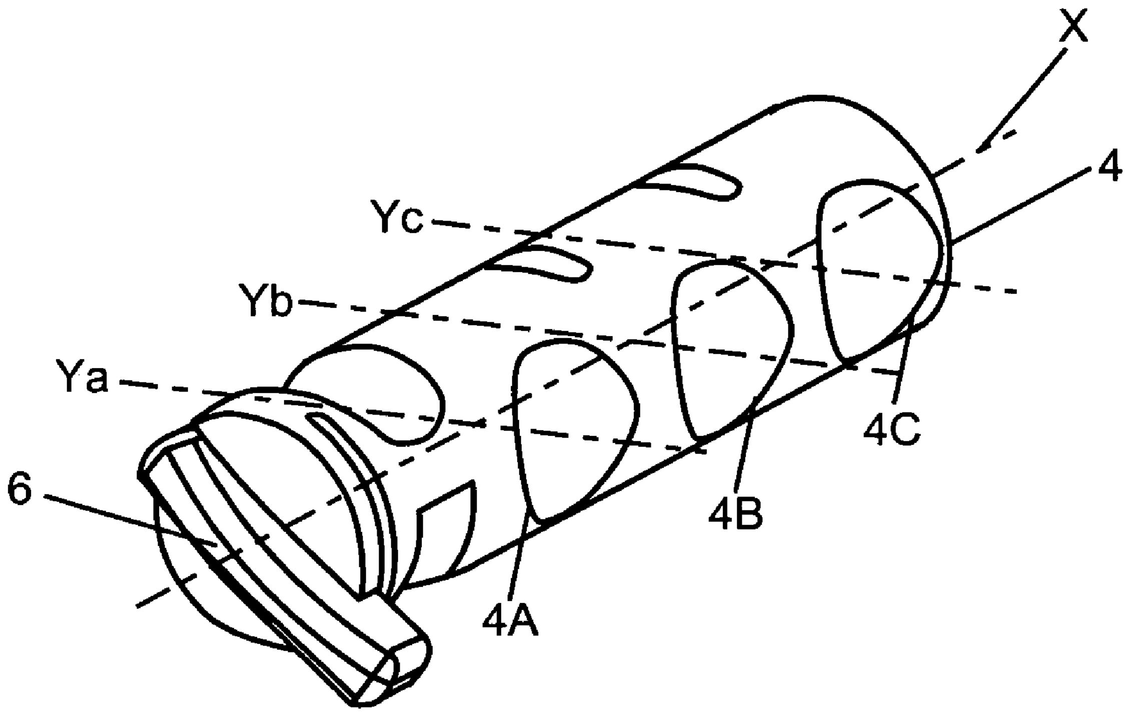
FIG. 7 represents a perspective view of a rotary drum of the operating handle according to FIGS. 1 to 6.

As represented in FIG. 7, at least one pass-through hole 4A is drilled in the rotary drum 4. Said at least one hole is made radially with respect to the rotary drum 4 and preferably passes via the centre of said drum. According to this embodiment of the invention, the drum comprises three radial holes 4A, 4B, 4C having paralell longitudinal axes YA, YB, YC. Moreover, the longitudinal axes YA, YB, YC of said holes are parallel to each other and spaced from each other along the longitudinal axis of the rotary drum 4.

When the rotary drum 4 is in a blocking position, at least one hole 4A, 4B, 4C of said rotary drum is aligned with a hole 3A, 3B, 3C present in the body 2 of the rotary operating handle 1. Preferably, each of the holes of the rotary drum 4 is aligned with a hole of the body 2. The respective longitudinal axes Ya-YA, Yb-YB, Yc-YC of said holes are then identical.

Figure 5:
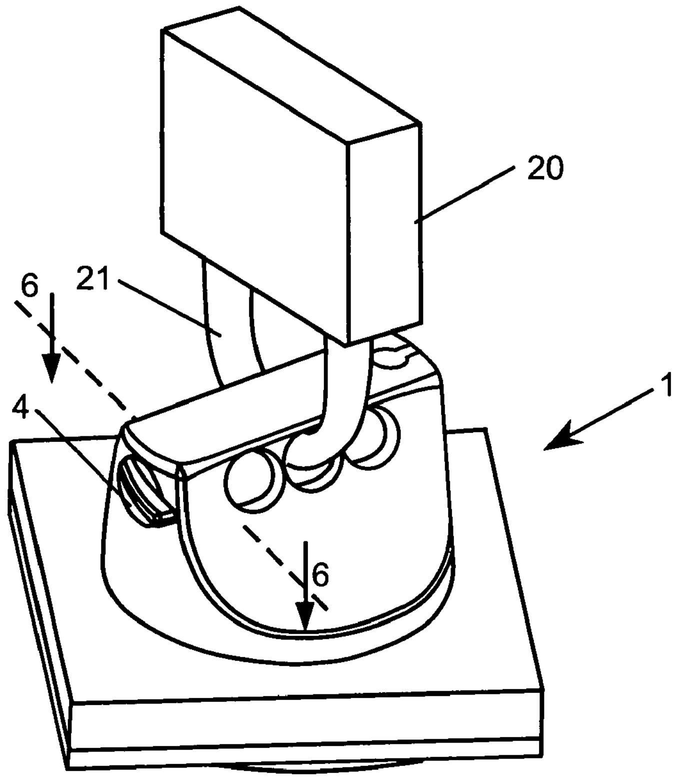
FIG. 5 represents a perspective view of the operating handle in the blocked position with locking means.
Figure 6:
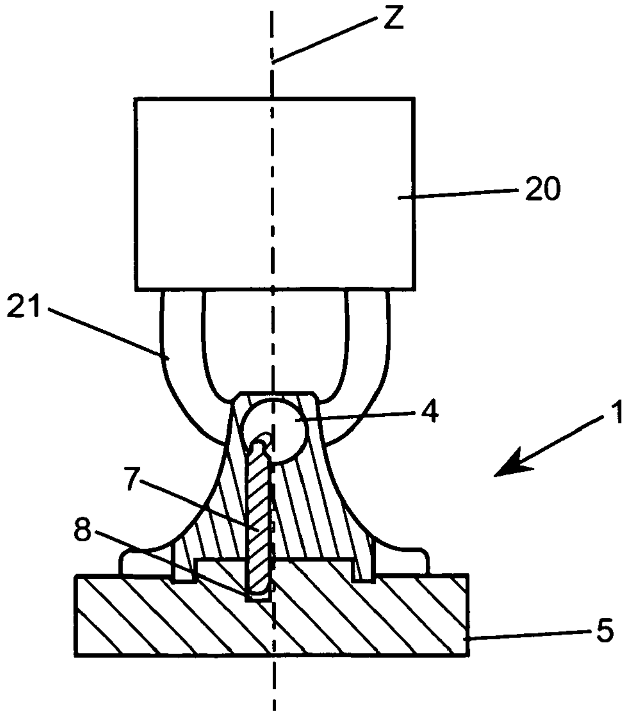
FIG. 6 represents a cross-sectional view of the operating handle taken along line 6-6 in FIG. 5.

As represented in FIGS. 5 and 6, in this blocking position, the shackle 21 of a padlock 20 can then be passed through the aligned holes 3A-4A, 3B-4B, 3C-4C. The presence of the padlocks 20 prevents any rotation of the rotary drum 4 from the locking position to the unlocked position thereof. The padlock(s) 20 is(are) therefore used to lock the blocking means in the blocking position of the rotary operating handle 1.

The external volume of the rotary operating handle 1 is not modified between the blocking position and the unblocked position.

According to a first preferred embodiment of the invention, rotation of the rotary drum 4 is automatically controlled by the movement of the rotary operating handle 1. Rotation of the rotary operating handle 1 from an open position to a closed position results in rotation of the rotary drum 4 from a blocking position to an unblocked position. In the opposite way, rotation of said handle from a closed position to an open position results in rotation of the rotary drum 4 from an unblocked position to a blocking position.

According to a second preferred embodiment of the invention, rotation of the rotary drum 4 takes place independently from the movement of the rotary operating handle 1. After the rotary operating handle 1 has been moved from a closed position to an open position, the user can place the blocking means in their blocking position. For this, the user moves the rotary drum 4 by means of seconds gripping means 6.

According to an alternative embodiment, flexible means position the rotary drum 4 by default in an unblocked position. The member or padlock(s) 20 hold(s) the rotary drum in the blocking position thereof. As soon as the padlocks 20 are removed from the holes 3A-4A, 3B-4B, 3C-4C, the flexible means position the rotary drum 4 in the unblocked position thereof. The holes 3A, 3B, 3C of the body are then no longer aligned with those 4A, 4B, 4C of the rotary drum 4. The flexible means comprise for example a torsion spring.

According to an alternative embodiment, the rotary operating handle 1 comprises a body 2 having a single hole enabling several padlock shackles to pass. The hole is preferably oblong-shaped and is sufficiently large to be able to accommodate three shackles 21 of padlocks 20.

According to another alternative embodiment, the rotary drum comprises a single hole enabling several padlock shackles to pass. The hole is preferably oblong-shaped and is sufficiently large to be able to accommodate three shackles 21 of padlocks 20.

The above two alternative embodiments can be combined to achieve substantially different solutions but all providing an answer to the same technical problem. Firstly, it can be envisaged to use a handle having a body 2 having an oblong hole and a rotary drum 4 having several distinct holes, the holes of said drum being able to be aligned with the oblong hole of the body. A second solution would consist in using a body 2 with an oblong hole able to accommodate several shackles and a drum comprising a hole of substantially similar size to that of the body. A third solution would consist in using a body 2 with several holes able to respectively accommodate a shackle and a drum comprising an oblong hole able to accommodate several shackles.

According to another alternative embodiment, the blocking means comprise several bolts 7. Rotation of the rotary drum to the blocking position thereof then results in movement of the bolts 7. The bolt or bolts can be of any geometric shape able to collaborate with the shape of the strike 8. For example, the bolt 7 can have a parallelepipedic shape.

The invention claimed is:

1. A lockable rotary operating handle assembly, comprising:

a rotary operating handle mounted on a frame for rotation about a Z axis, a longitudinal dimension of said handle extending laterally in an XY plane, with a bore therein, the axis of the bore extending in an X direction;

an elongate blocking bolt slideably mounted in the rotary operating handle so that a first end of said bolt is slideable into a strike in said frame;

a rotary drum rotatably mounted in the bore in said operating handle, a longitudinal axis of the drum extending in the X direction, the drum being rotatable about its longitudinal axis;

wherein a second end of the blocking bolt is in contact with the rotary drum so that rotation of the drum can move the first end of the bolt into and out of the strike, and when the first end of the bolt is in the strike, the operating handle cannot be rotated about the Z axis;

said operating handle having at least one lateral hole therethrough in the XY plane in a Y direction and passing through the bore in the handle, and the drum having at least one throughhole therein, the axis of the throughhole being substantially coaxial with the axis of the lateral hole in the operating handle when the drum is in a rotary position wherein the first end of the bolt is in the strike, so that a member extending through both the throughhole in the drum and the lateral hole in the handle can prevent rotation of the drum to maintain the first end of the bolt in the strike thereby preventing rotation of the handle about the Z axis.

2. The lockable rotary operating handle assembly of claim 1, wherein the operating handle includes three lateral holes in the XY plane, each extending in a Y direction with their axes substantially parallel to each other; and the drum includes three throughholes each substantially co-axial with one of the lateral holes in the handle when the drum is in a rotary position wherein the first end of the bolt is in the strike.

* * * * *